United States Patent [19]
Kojima

[11] Patent Number: 5,363,150
[45] Date of Patent: Nov. 8, 1994

[54] CASING FOR A TELEVISION SET

[75] Inventor: Kazunobu Kojima, Ibaraki, Japan

[73] Assignee: Matsushita Electric Industrial Co., Ltd., Osaka, Japan

[21] Appl. No.: 171,200

[22] Filed: Dec. 21, 1993

Related U.S. Application Data

[63] Continuation of Ser. No. 763,656, Sep. 18, 1991, abandoned.

[30] Foreign Application Priority Data

Sep. 21, 1990 [JP] Japan ................... 2-253237

[51] Int. Cl.[5] .................................... H04N 5/65
[52] U.S. Cl. ................... 348/836; 348/843; 312/7.2
[58] Field of Search ........... 348/836, 839, 843, 844; 312/7.2

[56] References Cited

U.S. PATENT DOCUMENTS

| | | | |
|---|---|---|---|
| 3,703,323 | 11/1972 | Gallas et al. | 312/7.2 |
| 4,006,300 | 2/1977 | Boldt et al. | 348/843 |
| 4,644,408 | 2/1987 | Coleman | 358/254 |
| 4,646,159 | 2/1987 | Beaumont et al. | 358/248 |
| 4,777,532 | 10/1988 | Hasegawa | 358/245 |
| 4,820,224 | 4/1989 | Lemche | 358/248 |
| 5,023,726 | 6/1991 | Campisi | 348/839 |
| 5,033,802 | 7/1991 | Fairbanks | 312/7.2 |
| 5,041,944 | 8/1991 | Campisi | 348/836 |
| 5,084,757 | 1/1992 | Leo et al. | 358/248 |

FOREIGN PATENT DOCUMENTS

| | | | |
|---|---|---|---|
| 0251330 | 3/1961 | Australia | 358/254 |
| 1278139 | 10/1961 | France | 358/248 |
| 2554299 | 5/1985 | France | H04N 5/645 |
| 2919002 | 11/1980 | Germany | 358/254 |
| 56-27575 | 3/1981 | Japan | 358/248 |

*Primary Examiner*—Richard E. Chilcot, Jr.
*Assistant Examiner*—Rafael Bacares
*Attorney, Agent, or Firm*—Ratner & Prestia

[57] ABSTRACT

A casing for use in a television set has a U-shaped frame for firmly supporting the cathode ray tube and a chassis arrangement for supporting a circuit arrangement for driving the cathode ray tube. An escutcheon is secured to the frame at a position in front of a screen of the cathode ray tube. A protection cover is connected to the frame for covering the cathode ray tube. Thus, the frame, chassis arrangement, escutcheon and protection cover taken together define an integral unit which is a semi-completed product that can be shipped from a factory. The casing further has a cabinet provided over the protection cover for covering and decorating the appearance the television set, and a back cover for enclosing the integral unit in the cabinet. The cabinet and the back cover can be applied at a local distribution station in accordance with the desire of the user.

6 Claims, 4 Drawing Sheets

CASING FOR A TELEVISION SET

This application is a continuation of application Ser. No. 07/763,656 filed Sep. 18, 1991 now abandoned.

BACKGROUND OF THE INVENTION

1. Field of the Invention

The present invention relates to a casing for a television set and, more particularly, to a casing arrangement having a box like configuration.

2. Description of the Prior Art

In FIG. 3, a television set Vp including a conventional casing is shown. The basic components of the television set includes a cathode ray tube (CRT) 107 and a circuit board 108 serving also as a chassis for driving CRT. The CRT 107 is mounted on a cabinet 100 with securing screws 111 inserted in mounting bosses 101d. Chassis 108 is provided with a printed circuit board 108a which is completed with electronic parts 108b and switches 108d. The circuit on the chassis 108 is connected with the CRT 107 through connection wires 108c. Chassis rails 117 are installed on the cabinet 100, and the chassis 108 is fixed to the cabinet 100 by guide grooves 117a of the chassis rails 117. After installing CRT 107 and chassis 108 on the cabinet 100, a back cover 102 is installed on the cabinet 100 with back cover installing securing screws 116 inserted in the bosses 101e.

In FIG. 4, an inner view of a conventional cabinet 100 of FIG. 3, viewed from the rear side thereof is shown. Since there are a number of CRT mounting bosses 101d, back cover installing bosses 101e, reinforcement ribs, the cabinet 100 is of an extremely complicated structure. Furthermore, the cabinet 100 has a role of installing CRT 107 and chassis 108, and of decorating the appearance of the television set Vp.

As described above, in the casing of the conventional television set Vp, since the cabinet 100 is arranged to install CRT 7 and chassis 108 therein, the structure of the cabinet 100 is extremely complicated. When the cabinet 100 is formed integrally by plastic, the metallic mold for forming a cabinet 100 becomes complicated, and also the forming cycle or period required in forming the cabinet becomes long. Furthermore, there is such a problem that the molded piece may have defects due to shrinkage, weld, and so on.

SUMMARY OF THE INVENTION

The object of the present invention is therefore to provide a casing for a television set which solves these problems.

The present invention has been developed with a view to substantially solving the above described disadvantages and has for its essential object to provide an improved casing.

In order to achieve the aforementioned objective, a casing for use in a television set having a cathode ray tube and a circuit arrangement for driving the cathode ray tube includes a frame means having an engaging member for firmly supporting the cathode ray tube, a chassis means having an engagable member for the engagement with the engaging member so that the chassis means is firmly connected to the frame means for supporting the circuit arrangement thereon, an escutcheon means secured to the frame means and located in front of a screen of the cathode ray tube, and a protection cover means connected to the frame means for covering the cathode ray tube. The frame means, chassis means, escutcheon means and protection cover means taken together define an integral unit.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which.

DETAILED DESCRIPTION OF THE PREFERRED EMBODIMENTS

Figure 1:
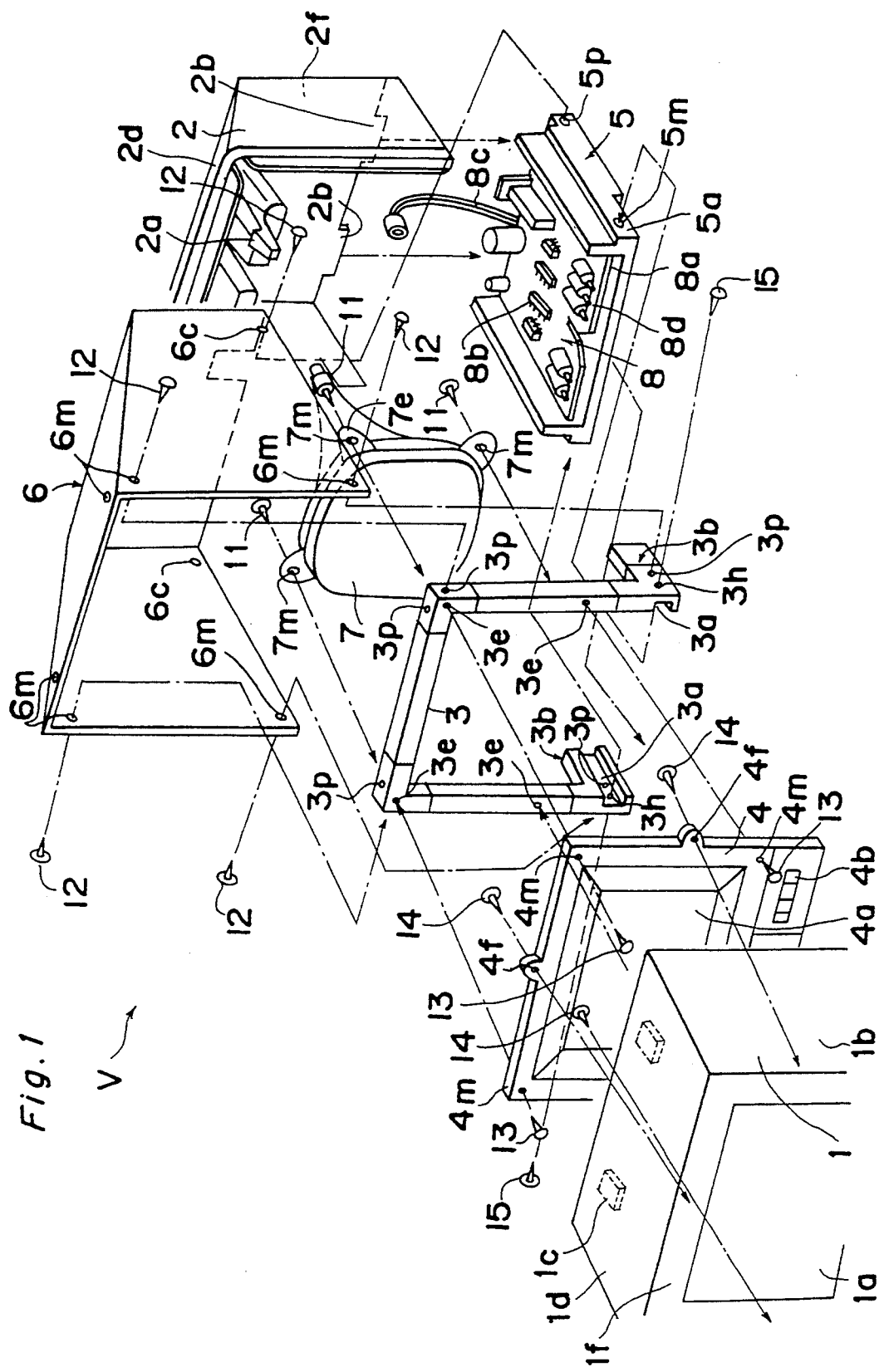
FIG. 1 is an exploded perspective view of a casing of a television set according to a preferred embodiment of the present invention.
Figure 2:
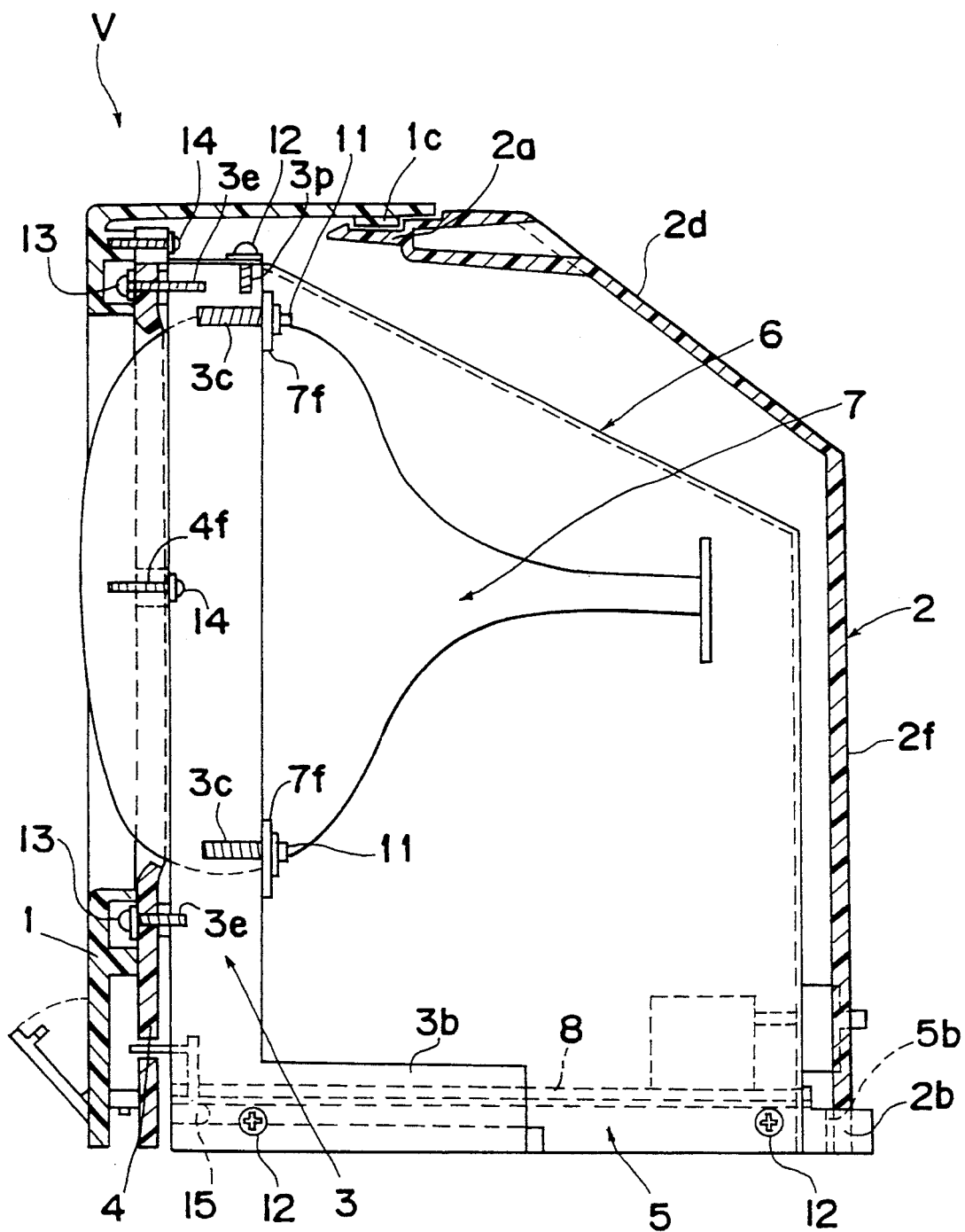
FIG. 2 is a sectional side view of the television set shown in FIG. 1.

Referring to FIGS. 1 and 2, a television set V including a casing according to a preferred embodiment of the present invention is shown.

A cathode ray tube (CRT) 7 for producing an image has a flange 7f formed with a through hole 7m at each of four corners thereof.

A mounting frame 3 has three beams which are connected substantially perpendicular to each neighboring beam to form a U-shaped frame extending in a plane parallel to the screen of the CRT 7. The mounting frame 3 further includes two bases 3b at free ends of the U-shaped frame. More specifically, each base 3b extends from one free end of the U-shaped frame and is bend substantially perpendicular to form an L-shaped base. The bases 3b oppose to each other. The base 3b is formed with a guide groove 3a extending perpendicular to the plane of the U-shaped frame. The mounting frame 3 is formed with a number of holes 3c (shown in FIG. 2) on the back face at places pattern corresponding to those of the holes 7m of CRT 7. On the peripheral surface of the U-shaped frame, a number of screw holes 3p are formed. Similarly bases 3b have through holes 3h opened at the bottom of the guide grooves 3a. The mounting frame 3 is further formed with a number of holes 3e on the front face thereof.

A chassis 8 is provided for supporting a printed circuit board 8a on which electronic parts 8b and switches 8d for driving the CRT are mounted.

A chassis retainer 5 is defined by a square plate and two side walls. Each of the two side walls has a projection 5a for being engaged in the groove 3a. Holes 5m and 5p are provided on the surface of the projection 5a. As shown in FIG. 2, a rectangular hole 5b is further formed at the back of the chassis retainer 5 so as to receive tongues 2b as will be described later.

An escutcheon plate 4 formed with a square opening is positioned in front of the U-shaped frame. The escutcheon plate 4 has three projections with a through hole 4f formed therein. Also, a number of holes 4m are formed at each of four corners of the square opening.

A protection cover 6 has a generally rectangular box-like configuration and is opened at two sides, front side and bottom side. Adjacent the front open side a number of screw holes 6m are provided. Also, a number of screw holes 6c are formed at the back face of the cover 6.

A cabinet 1 generally having a rectangular box-like configuration is defined by two side walls 1b, a top wall 1d, and a front wall 1f. At a front wall 1f, a square opening 1a is formed, and two blocks 1c are provided on the inner surface of the top wall 1d thereof. Inside surface of the front wall 1f, a number of screw holes 1e (shown in FIG. 2) are formed.

A back cover 2, also, a generally having a rectangular box-like configuration is defined by two side walls 2b, a top wall 2d, and a back wall 2f. A claw 2a is provided on the end portion of the top wall 2d and tongues 2b are provided at the bottom end of the back wall 2f.

The CRT 7 is fixed to the mounting frame 3 by CRT securing screws 11 screwed in holes 7m at the flange 7f and holes 3c.

The chassis retainer 5 holding the chassis 8 is inserted in the guide grooves 3a in the mounting frame 3 such that projection portions 5a fit in guide grooves 3a. The chassis retainer 5 is inserted until holes of 3h and 5m are aligned. The chassis frame 5 and the mounting frame 3 are firmly fixed with secured to each other by chassis screws 15 supplied through holes 3h and 5m.

The escutcheon plate 4 is placed firmly on the front face of the mounting frame 3 with escutcheon screws 13 inserted in holes 3e and 4m.

The protection cover 6 is placed firmly on the mounting frame 3 with cover screws 12 inserted in holes 3p and 6m. Thus, CRT 7 and chassis 8 which are the basic constituent members of a television set are enclosed by the chassis retainer 5, mounting frame 3, escutcheon plate 4 and cover 6. Thus, the above described components can be assembled in one unit.

The cabinet 1 is installed on the front face of the escutcheon plate 4 and fixed thereto with cabinet securing screws 14 screwed in holes 4f and 1e.

The back cover 2 is installed from the back side such that the claws 2a are engaged with the fixing blocks 1c in a ratchet-and-claw engagement, and the tongues 2b are inserted into the rectangular holes 5b provided on the back portion of the chassis retainer 5.

As described above, since CRT 7 and chassis 8 are not directly coupled to the cabinet 1, but are installed on the mounting frame structure comprised of mounting frame 3, the number of installation bosses on the cabinet 1 can be reduced and, thus cabinet 1 can be constructed in a simple structure.

Figure 3:
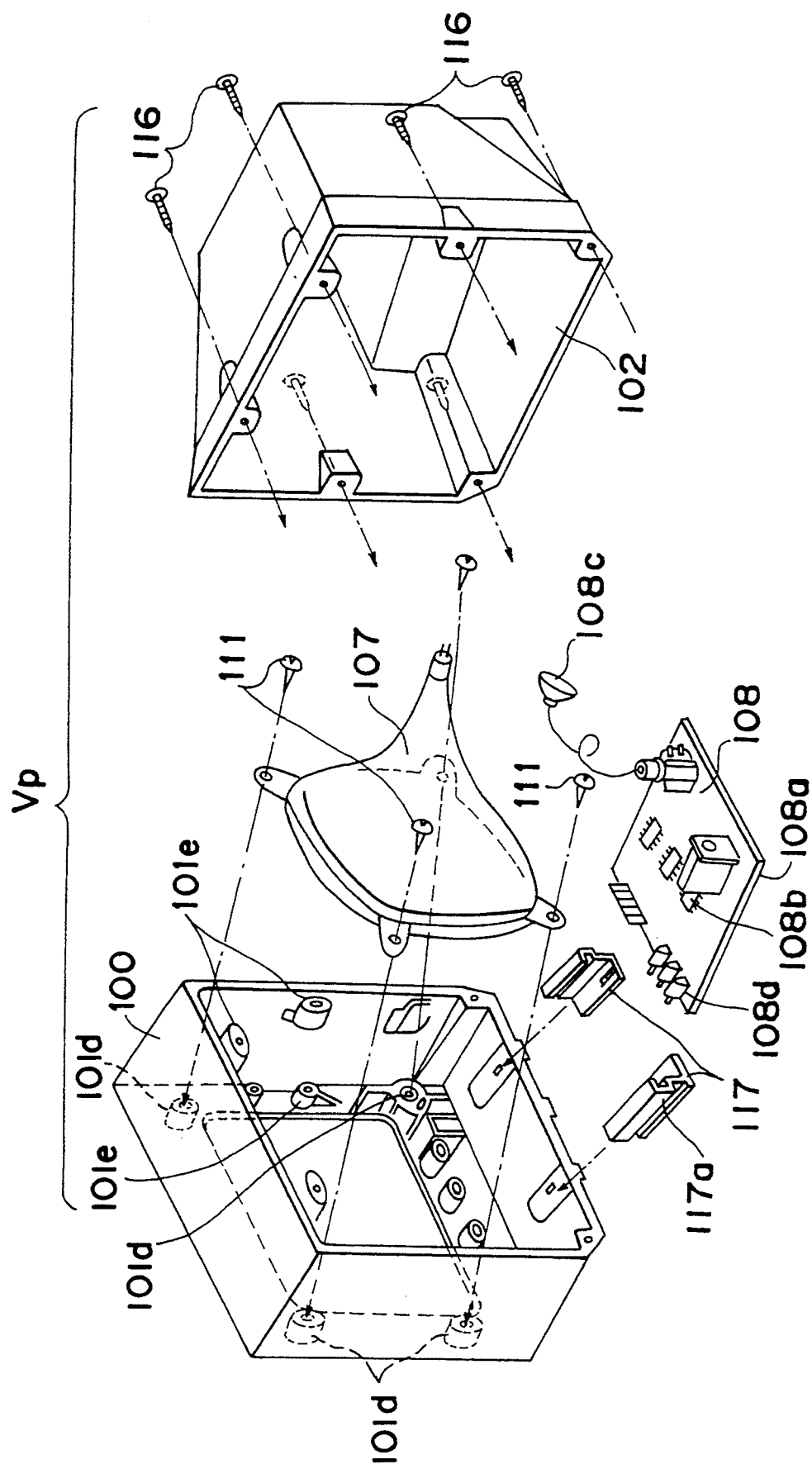
FIG. 3 is an exploded perspective view of a conventional casing of a television set.
Figure 4:
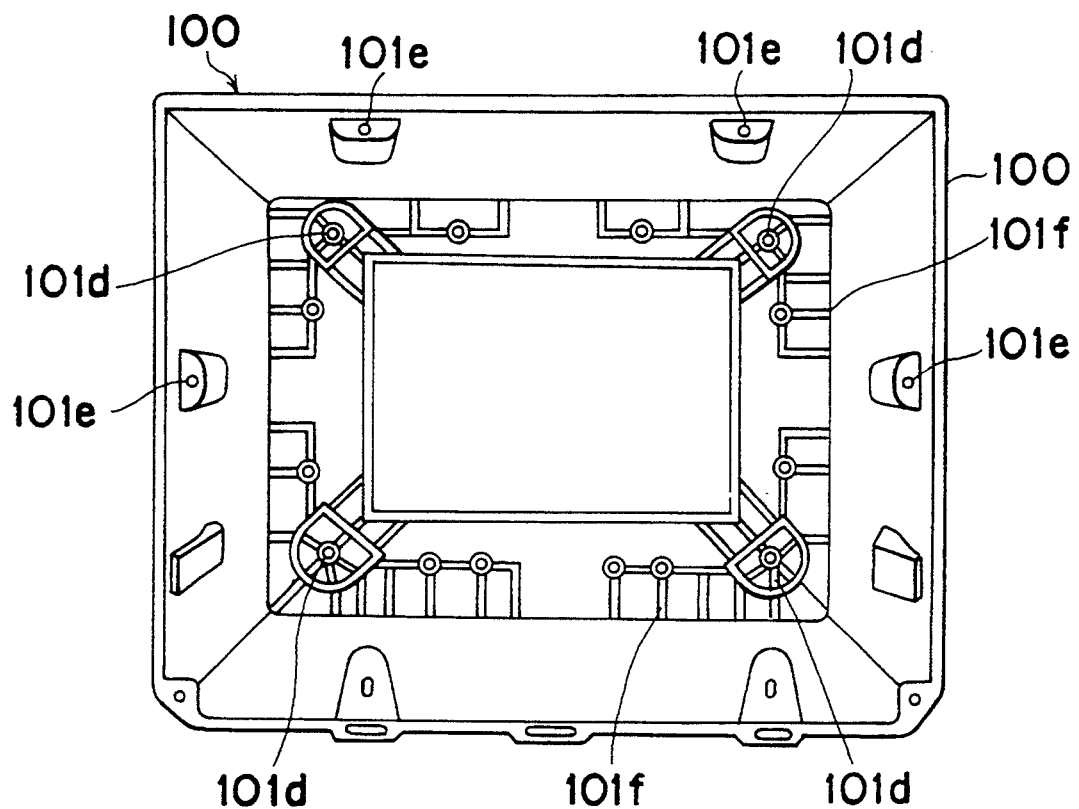
FIG. 4 is a back plan view of a conventional cabinet, shown in FIG. 3, viewed from the rear side thereof.
Figure 5:
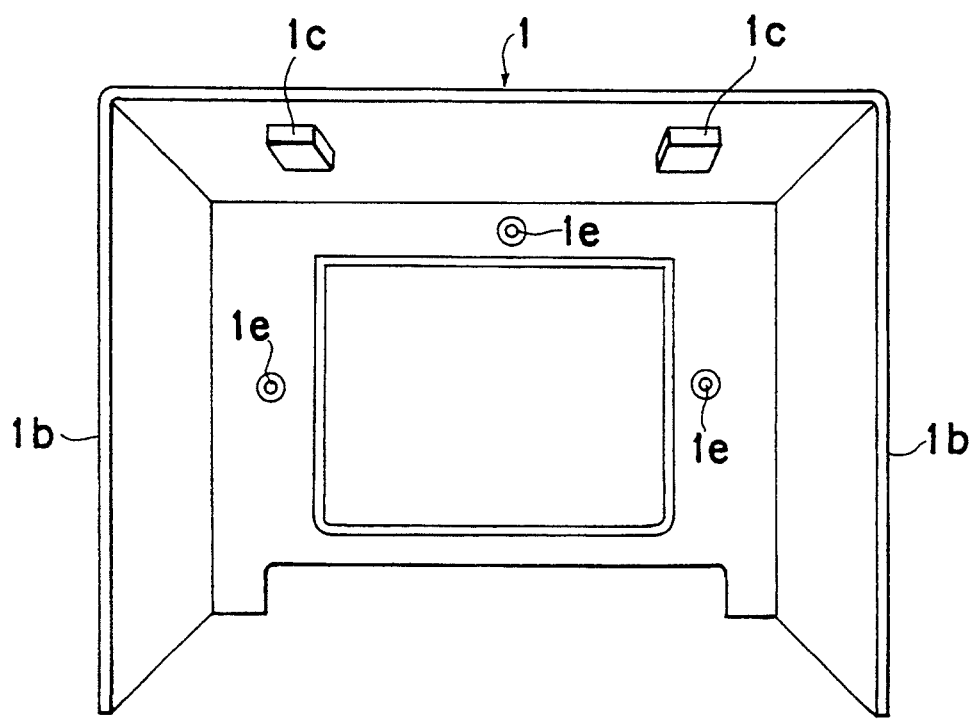
FIG. 5 is a back plan view of a cabinet according to the present invention, shown in FIG. 1, viewed from the rear side thereof.

As shown in FIG. 5, the inner face of the cabinet 1 according to a preferred embodiment of the present invention can be simplified in construction as compared with the conventional cabinet 100 shown in FIG. 3. Thus, simplified structure enables the metallic mold for the cabinet 1 to be simple in structure, consequently reducing the forming cycle or the time required to form the cabinet 1. Furthermore, the defects in the molded products can be reduced, and the manufacturing cost can be reduced.

Furthermore, nowadays, users have various tastes and accordingly, the needs for various design of the television set is required. In order to comply with such needs of the user, it is preferable to complete the installation of the outer furnishings such as cabinets and back covers at a place close to the users, as much as possible.

In the preferred embodiment of the present invention, the integral block containing all of the basic operation functions as a television set is constituted by installing the basic components, i.e., CRT 7 and chassis 8 on the mounting frame 3. Then, the escutcheon 4 and protection cover 6 are applied to form a shipping product that has a minimum necessary outer furniture.

As is apparent from the above descriptions, casing according to the present invention makes it possible to supply the television set without cabinet and back cover and to complete the television set by applying desired cabinet and back cover, selected based on user's taste, at the local distribution station. Thus, it is possible to supply unique products which satisfies various users. More specifically, it is possible to ship, from a factory, a semi-completed product. The product may be completed at a local distribution station at which cabinets and back are applied in accordance with the user's desire.

Furthermore, since according to the present invention the cabinet and the back cover are installed after the CRT, chassis, protection cover and escutcheon are assembled, the cabinet structure can be simplified and the cost can be reduced. Furthermore, since the CRT, chassis, protection cover and escutcheon are installed on the mounting frame to constitute an integral unit, it is possible to ship from the factory in semi-completed product, and to complete the product at a local distribution station.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A casing for use in a television set having a cathode ray tube and a circuit arrangement for driving the cathode ray tube, said casing comprising:

a back cover means defined by two side walls, a top wall provided with a claw on an end portion of said top wall, and a back wall provided with tongues at a bottom end of said back wall;

a cabinet means defined by two side walls, a front wall, and a top wall provided with two blocks on the inner surface of said top wall; and an integral unit consisting of:

(a) a frame means for firmly supporting said cathode ray tube, said frame means having an engaging member;

(b) a chassis means having a plate-like shape for supporting said circuit arrangement thereon, said chassis means having:
 (i) an engagable member for the engagement with said engaging member so that said chassis means is firmly connected to said frame means,
 (ii) a top surface on which is mounted a printed circuit board with electronic parts and switches, and
 (iii) a bottom surface having holes for receiving said tongues of said back cover means;

(c) an escutcheon means secured to said frame means and located in front of a screen of said cathode ray tube; and (d) a protection cover means connected to said frame means for covering said cathode ray tube, wherein said integral unit has a bottom side, a front portion and a back portion, and wherein said bottom surface of said chassis means encloses the bottom side of said integral unit.

2. A casing as claimed in claim 1, wherein:

said cabinet means is provided over said protection cover means for covering, together with said chassis means, the front portion of said integral unit and for decorating the appearance of the television set; and said back cover means is provided for covering, together with said chassis means, the back portion of said integral unit and for decorating the appearance of the television set.

3. A casing as claimed in claim 1, wherein said frame means has a U-shaped configuration.

4. A casing as claimed in claim 1, wherein said engaging member is a block having an engaging groove.

5. A casing as claimed in claim 4, wherein said engagable member is a projection engaged to said engaging groove.

6. A casing for use in a television set having a cathode ray tube and a circuit arrangement for driving the cathode ray tube, said casing comprising:

a back cover means defined by two side walls, a top wall provided with a claw on an end portion of said top wall, and a back wall provided with tongues at a bottom end of said back wall;

a cabinet means defined by two side walls, a front wall, and a top wall provided with two blocks on the inner surface of said top wall; and an integral unit consisting of:
  (a) a frame means for firmly supporting said cathode ray tube, said frame means having an engaging member,
  (b) a chassis means for supporting said circuit arrangement thereon, said chassis means having:
    (i) holes for receiving said tongues of said back cover means, and
    (ii) an engagable member for the engagement with said engaging member so that said chassis means is firmly connected to said frame means,
  (c) an escutcheon means secured to said frame means and located in front of a screen of said cathode ray tube, and
  (d) a protection cover means connected to said frame means for covering said cathode ray tube.

* * * * *